United States Patent
Cha et al.

(10) Patent No.: US 8,834,634 B2
(45) Date of Patent: Sep. 16, 2014

(54) LASER CLEANING DEVICE FOR ELECTRODE TAB OF BATTERY AND LASER CLEANING METHOD USING THE SAME

(75) Inventors: Jung-Bae Cha, Yongin-si (KR); Jae-Ho Jeong, Yongin-si (KR); Kyung-Doo Ha, Yongin-si (KR); Won-Yong Lee, Yongin-si (KR); Bo-Hye Yun, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 1035 days.

(21) Appl. No.: 12/883,867

(22) Filed: Sep. 16, 2010

(65) Prior Publication Data
US 2011/0290276 A1  Dec. 1, 2011

(30) Foreign Application Priority Data

May 28, 2010  (KR) .................. 10-2010-0050491

(51) Int. Cl.
| | | |
|---|---|---|
| H01M 2/26 | (2006.01) | |
| B23K 26/06 | (2014.01) | |
| B23K 26/00 | (2014.01) | |
| B08B 7/00 | (2006.01) | |
| B23K 26/12 | (2014.01) | |

(52) U.S. Cl.
CPC ............... *B08B 7/0042* (2013.01); *H01M 2/26* (2013.01); *B23K 2201/38* (2013.01); *B23K 26/0639* (2013.01); *B23K 26/0066* (2013.01); *B23K 26/127* (2013.01)
USPC .................. 134/1; 134/61; 134/63; 134/142; 29/623.1; 29/874; 219/121.86

(58) Field of Classification Search
CPC ... B08B 7/0042; H01M 2/26; B23K 26/0066; B23K 26/127; B23K 2201/38
USPC .......... 134/1, 1.3, 61, 63, 142; 29/623.1, 874; 219/121.86
See application file for complete search history.

(56) References Cited

U.S. PATENT DOCUMENTS 6,701,942 B2 *  3/2004  Lee et al. .................. 134/61
8,256,441 B2 *  9/2012  Moriya et al. ............ 134/186

(Continued)

FOREIGN PATENT DOCUMENTS

CN    1078415 A    11/1993
CN    1939643 A    4/2007

(Continued)

OTHER PUBLICATIONS

Chinese Office Action issued by State Intellectual Patent Office on Oct. 12, 2013 in connection with Chinese Patent Application No. 201010559449.3, which also claims Korean Patent Application Serial No. 10-2010-0050491 as its priority document.

(Continued)

*Primary Examiner* — Samuel M Heinrich
(74) *Attorney, Agent, or Firm* — Robert E. Bushnell, Esq.

(57) ABSTRACT

A laser cleaning device, and a laser cleaning method using the same, for removing an electrolyte solution stuck to an electrolyte tab during a process of injecting the electrolyte solution are disclosed. The laser cleaning device for an electrode tab of a battery includes: a cleaning housing, in which a battery case for receiving an electrode group, an electrolyte solution and an electrode tab exposed to the outside are embedded; a laser generator which includes a laser source for generating a laser beam and an output controller for controlling output of the laser beam; a laser transmitter which transmits the laser beam generated by the laser generator; and a laser emitting unit which is installed inside the cleaning housing, and which irradiates the laser beam transmitted by the laser transmitter onto the electrode tab so as to remove liquid pollutants stuck to the electrode tab. The laser cleaning method comprises steps generally corresponding to the latter functions of the laser cleaning device.

21 Claims, 7 Drawing Sheets

(56) References Cited

U.S. PATENT DOCUMENTS

| | | | |
|---|---|---|---|
| 8,344,285 B2* | 1/2013 | Sykes et al. | 219/121.68 |
| 8,465,554 B2* | 6/2013 | Choi et al. | 29/25.03 |
| 2001/0007421 A1 | 7/2001 | Marcuse et al. | |
| 2003/0106881 A1 | 6/2003 | Lee et al. | |
| 2003/0121896 A1 | 7/2003 | Yu | |

FOREIGN PATENT DOCUMENTS

| | | |
|---|---|---|
| KR | 1991-7000104 | 3/1991 |
| KR | 19970054721 A | 7/1997 |
| KR | 10-2003-0012364 | 2/2003 |
| KR | 20060034988 A | 4/2006 |
| KR | 1020060034988 A | 4/2006 |
| KR | 1020060063130 A | 6/2006 |
| KR | 10-2006-0126267 | 12/2006 |
| KR | 10-2008-0095420 | 10/2008 |
| KR | 10-2008-0105862 | 12/2008 |
| KR | 10-2009-0002784 | 1/2009 |
| KR | 10-2009-0005837 | 1/2009 |
| WO | 90/07988 | 7/1990 |

OTHER PUBLICATIONS

Korean Notice of Allowance issued by Korean Patent Office on Mar. 19, 2012 in connection with Korean Patent Application Serial No. 10-2010-0050491 and Request for Entry of the Accompanying Office Action attached herewith.

Korean Office Action issued by Korean Patent Office on Jul. 19, 2011, corresponding to Korean Patent Application No. 10-2010-0050491 and Request for Entry of Accompanying Office Action attached herewith.

Chinese Office Action dated Mar. 28, 2013 corresponding Korean Patent Application 2010-0050491, and English abstract.

* cited by examiner

LASER CLEANING DEVICE FOR ELECTRODE TAB OF BATTERY AND LASER CLEANING METHOD USING THE SAME

CLAIM OF PRIORITY

This application makes reference to, incorporates the same herein, and claims all benefits accruing under 35 U.S.C. §119 from an application filed in the Korean Intellectual Property Office on May 28, 2010 and there duly assigned Serial No. 10-2010-0050491.

BACKGROUND OF THE INVENTION

1. Field of the Invention

The present invention relates generally to a laser cleaning device for an electrode tab of a battery and, more particularly, to a laser cleaning device for removing an electrolyte solute stuck to an electrode tab during a process of injecting electrolyte, and a laser cleaning method using the same.

2. Description of the Related Art

A battery can be classified into a primary battery which cannot be charged and a rechargeable battery which can be charged. Among those, a low-capacity primary battery or rechargeable battery has been used as a power supply for portable small electronic devices, such as a mobile phone, a notebook computer and a camcorder, and a large-capacity rechargeable battery has bee used as a power supply for driving a motor, such as a hybrid car, an electric car, etc.

The battery basically includes: an electrode group including a positive electrode, a negative electrode, and a separator; a case for receiving the electrode group together with an electrolyte solution; and a cap assembly for sealing the case. In the case of a cylindrical battery, the positive electrode may be electrically connected to a cap assembly and a negative electrode may be electrically connected to the case. To this end, a positive tab attached to the positive electrode may be fixed to an inner side of the cap assembly, and a negative tab attached to the negative electrode may be fixed to an inner side of the case.

Since a general cylindrical battery does not have an electrolyte solution injection hole, it is subjected to a process of inserting the electrode group into the case, injecting the electrolyte into the case, mounting the cap assembly on the case, and then sealing the case. The negative tab is fixed to the case before the electrolyte solution injection, the positive tab is fixed to the cap assembly after the electrolyte solution injection, and the cap assembly to which the positive tab is fixed is mounted on the case together with a gasket.

As described above, in the structure where the electrolyte solution is injected into the case and then the cap assembly is mounted, the electrolyte solution is stuck to the electrode tab, for example, the positive tab. In this case, since the conductive characteristics and assembling performance of the electrode tab are degraded, the electrolyte solution stuck to the electrode tab should be removed. However, since the electrode tab has a very small thickness of approximately 0.1 mm, it is required to pay careful attention to the handling of the electrode tab, and secondary foreign materials should not occur in the cleaning process.

The above information disclosed in this Background section is only for enhancement of an understanding of the background of the described technology, and therefore it may contain information that does not form the prior art which is already known in this country to a person of ordinary skill in the art.

SUMMARY OF THE INVENTION

The present invention has been developed in an effort to provide a laser cleaning device for an electrode tab of a battery having the advantages of effectively removing an electrolyte solution stuck to an electrode tab after injecting an electrolyte solution, simplifying system configuration, and improving productivity, and a laser cleaning method using the same.

An exemplary embodiment provides a laser cleaning device for an electrode tab of a battery, the device comprising: a cleaning housing in which a battery case for receiving an electrode group, an electrolyte solution and an electrode tab exposed to the outside are embedded; a laser generator which includes a laser source for generating a laser beam and an output controller for controlling output of the laser beam; a laser transmitter which transmits the laser beam generated by the laser generator; and a laser emitting unit which is installed inside the cleaning housing, and which irradiates the laser beam transmitted by the laser transmitter to the electrode tab so as to remove liquid pollutants stuck to the electrode tab.

The laser source may generate Nd:YAG pulse laser, and energy per pulse of the Nd:YAG pulse laser may be 14 J to 34 J. The laser transmitter may be configured as an optical fiber cable.

The laser emitting unit may include at least a magnifying optical unit, a modifying optical unit, or a focusing optical unit. The modifying optical unit may include a laser absorption mask in which an opening for determining a shape of the laser beam is formed. The focusing optical unit may include a convex lens and a lens moving unit which changes the position of the convex lens. The laser emitting unit may emit a laser beam having a diameter two to three times larger than the width of the electrode tab.

The laser cleaning device for the electrode tab of the battery may further include a positional controller which is coupled to the laser emitting unit so as to change the position of the laser emitting unit.

The laser cleaning device for the electrode tab of the battery may further include an erect device which is installed inside the cleaning housing, and which is connected to the electrode tab so as to erect and spread the electrode tab. The erect device may include a holder unit which pressurizes the electrode tab so as to fix the electrode tab, and a vertical moving unit which moves the holder unit in a vertical direction.

A plurality of battery cases may be provided at a distance from each other. The laser cleaning device for the electrode tab of the battery may further include a support which supports the plurality of battery cases, and a first transferring unit which is installed on the support and which moves the plurality of battery cases along a defined orbit.

The erect device may be provided in plural in correspondence to the number of battery cases. The laser cleaning device for the electrode tab of the battery may further include a second transferring unit which is connected to the plurality of erect devices so as to move the plurality of erect devices along the same orbit as the first transferring unit.

The laser cleaning device for the electrode tab of the battery may further include a laser absorber which is disposed at the rear of the electrode tab in the cleaning housing, and which absorbs the remaining energy of laser beam.

The laser cleaning device for the electrode tab of the battery may further include an exhaust unit which is installed in the cleaning housing. The exhaust unit may include a dust collecting device which collects and removes pollutants, and an exhaust duct which discharges air from which pollutants are removed to the outside of the cleaning device.

The laser cleaning device for the electrode tab of the battery may further include a monitoring system which monitors and records the cleaning process of the battery tab. The monitoring system may include a photographing unit which photographs the cleaning process of the battery tab and a display unit which displays image information obtained from the photographing unit.

Another exemplary embodiment provides a laser cleaning method for an electrode tab of a battery, the method comprising the steps of: mounting a battery case, which receives an electrolyte solution and exposes an electrode tab, in a cleaning housing; generating a laser beam having an output which is controlled by a laser generator; transmitting the laser beam to a laser emitting unit by using a laser transmitter; and setting the shape and size of the laser beam by controlling optical magnification of the laser emitting unit, and then irradiating the laser beam onto the electrode tab.

In the mounting of the battery case, the electrode tab may be erected and spread by using the erect device. The electrode tab may be erected so as to be maintained at an angle of 80° to 100° with respect to the irradiation direction of the laser beam.

In the irradiating of the laser beam, the diameter of the laser beam may be two to three times the width of the electrode tab. In the irradiating of the laser beam, a laser absorber may be disposed in the rear of the electrode tab so as to absorb the remaining energy of the laser beam. In the irradiating of the laser beam, pollutants may be collected and removed during the laser cleaning process by using the dust collecting device.

According to the exemplary embodiments, the electrolyte solution stuck to the electrode tab is vaporized and removed using the thermal energy of the laser beam. The laser cleaning technology can effectively clean an electrode tab having a small thickness without applying friction to the electrode tab, it does not damage the electrode tab or cause secondary pollution, it simplifies the system configuration, and it improves productivity.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, the present invention will be described more fully with reference to the accompanying drawings, in which exemplary embodiments of the invention are shown. As those skilled in the art will realize, the described embodiments may be modified in various different ways, all without departing from the spirit or scope of the present invention.

Figure 1:
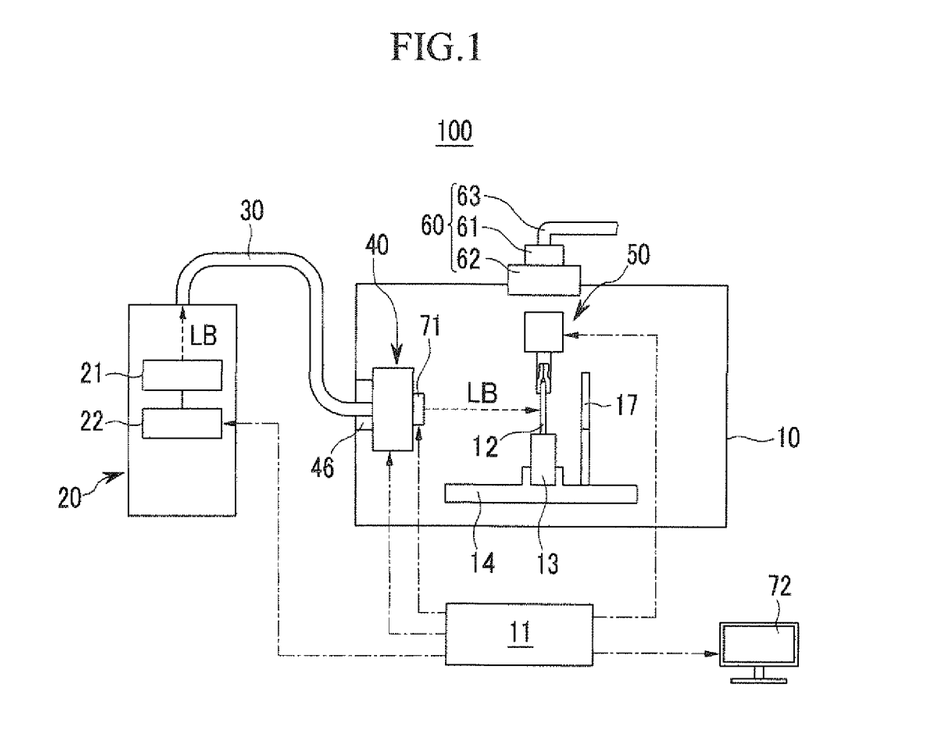
FIG. 1 is a configuration diagram showing a laser cleaning device for an electrode tab of a battery according to an exemplary embodiment.

FIG. 1 is a configuration diagram showing a laser cleaning device for an electrode tab of a battery according to an exemplary embodiment.

Referring to FIG. 1, a laser cleaning device 100 according to an exemplary embodiment includes a cleaning housing 10, a laser generator 20, a laser transmitter 30, and a laser emitting unit 40. The operations of each member included in the laser cleaning device 100 are controlled by an integrated controller 11.

The laser generator 20 generates laser beam (LB) for removing an electrolyte solution which is a liquid pollutant stuck to the electrode tab 12. The laser generator 20 includes a laser source 21 which generates the laser beam LB and an output controller 22 which controls the output of the laser beam (LB). The output controller 22 is connected to the integrated controller 11 so as to output the laser beam (LB) according to a control signal of the integrated controller 11.

As the laser beam (LB), a Nd:YAG pulse laser having a pulse width of 1,064 nm may be used. The laser beam (LB) vaporizes the electrolyte solution stuck to the electrode tab 12 using thermal energy so as to clean the electrode tab 12. The laser cleaning does not apply friction to the electrode tab 12, thereby making it possible to effectively clean the electrode tab 12 having a small thickness.

The energy per the pulse of the laser beam (LB) may be 14 J to 34 J. If energy per pulse of the laser beam (LB) is smaller than 14 J, it is impossible to perform the cleaning using the laser beam (LB), and if energy per pulse of the laser beam (LB) is larger than 34 J, the electrode tab 12 may be damaged during the cleaning process.

The laser generator 20 is positioned outside the cleaning housing 10, and the laser emitting unit 40 is positioned inside the cleaning housing 10. The laser transmitter 30 is installed between the laser generator 20 and the laser emitting unit 40 so as to transmit the laser beam (LB) generated by the laser generator 20 to the laser emitting unit 40. The laser transmitter 30 may be formed as an optical fiber cable. The optical fiber cable is configured as an optical fiber transmitting a laser beam and a coating material surrounding the optical fiber.

The laser emitting unit 40 emits the laser beam (LB) received from the laser transmitter 30 to the electrode tab 12. The laser emitting unit 40 includes an optical device therein, thereby making it possible to control the size of the laser beam (LB), energy density ($J/cm^2$) per unit area, and the shape of the laser beam (LB), etc.

Figure 2:
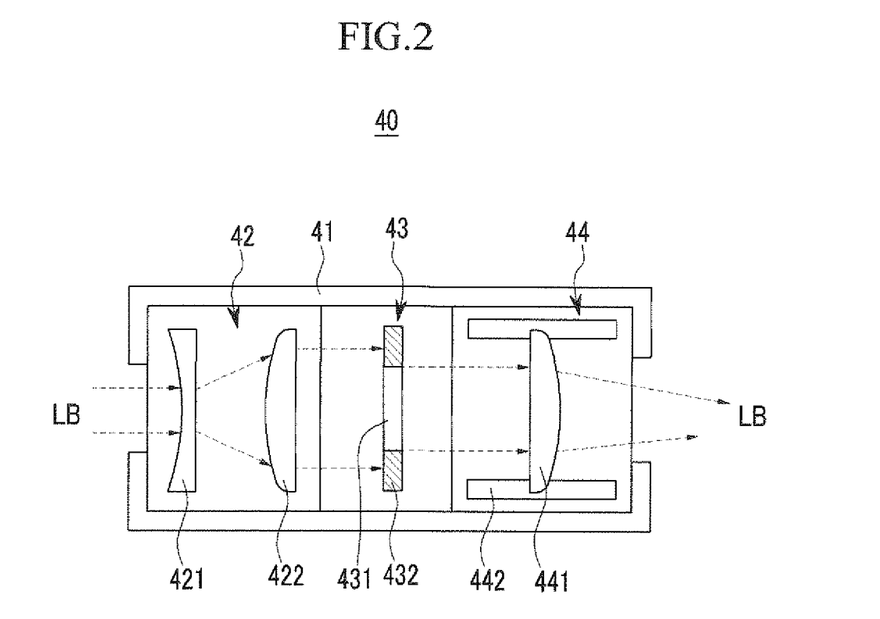
FIG. 2 is a configuration diagram showing a laser emitting unit in the laser cleaning device shown in FIG. 1.

FIG. 2 is a configuration diagram showing a laser emitting unit in the laser cleaning device shown in FIG. 1.

Referring to FIG. 2, a magnifying optical unit 42, a modifying optical unit 43, and a focusing optical unit 44 are included in the case 41 of the laser emitting unit 40. The laser emitting unit 40 may use all three optical units or some of three optical units according to the purpose.

The magnifying optical unit 42 includes a concave lens 421 and a convex lens 422, and magnifies the laser beam (LB) to a desired magnification by the optical action of the concave lens 421 and the convex lens 422. The magnifying optical unit 43 includes a laser absorption mask 432 having a center which is formed with an opening 431. The laser beam (LB) provided at the laser absorption mask 432 is outputted in the same shape as the opening 431 while the edge is absorbed in the laser absorption mask 432. The laser beam (LB) may be modified in an advantageous shape for cleaning, such as the shape of a circle, an oval, etc.

The focusing optical unit 44 includes a convex lens 441 and focuses the laser beam (LB) passing through the modifying optical unit 43 so as to implement an energy density having sufficient intensity to perform the cleaning. The focusing optical unit 44 may include a lens moving unit 442 which changes the position of the convex lens 441. The size of the laser beam (LB) and the energy density of the laser beam (LB) reaching the electrode tab 12 can be easily controlled by changing the position of the convex lens 441 using the lens moving unit 442.

Referring back to FIG. 1, the laser cleaning device 100 may include a positional controller 46 which moves the laser emitting unit 40 in a horizontal direction and a vertical direction so as to control the light emitting position of the laser beam (LB). The positional controller 46 is installed in an inner wall of the cleaning housing 10, and moves the laser emitting unit 40 in a direction parallel to the inner wall of the cleaning housing 10, thereby making it possible to freely control the position of the laser beam (LB).

The support 14 which supports the battery case 13 is positioned inside the cleaning housing 10. The battery case 13 includes the electrode group and the electrolyte solution therein. The electrode group includes a positive electrode, a negative electrode, and a separator, wherein a portion of the electrode tab 12 is exposed to the outside of the battery case 13.

The electrode tab 12 may be a positive tab connected to a positive electrode and a negative tab connected to a negative electrode. On the other hand, two electrode tabs (positive tab and negative tab) may be exposed to the outside of the battery case 13. FIG. 1 shows, by way of example, the case where one electrode tab 12 is exposed to the outside of the battery case 13.

After the injection of the electrolyte solution is completed, the electrode tab 12 is in a state wherein it has fallen or is inclined in any one direction. In this state, since the laser beam (LB) cannot be irradiated onto the electrode tab 12, the electrolyte solution stuck to the electrode tab 12 cannot be removed. Therefore, the laser cleaning device 100 includes an erect device 50 which erects and spreads the electrode tab 12 and facilitates the laser cleaning device.

Figure 3:
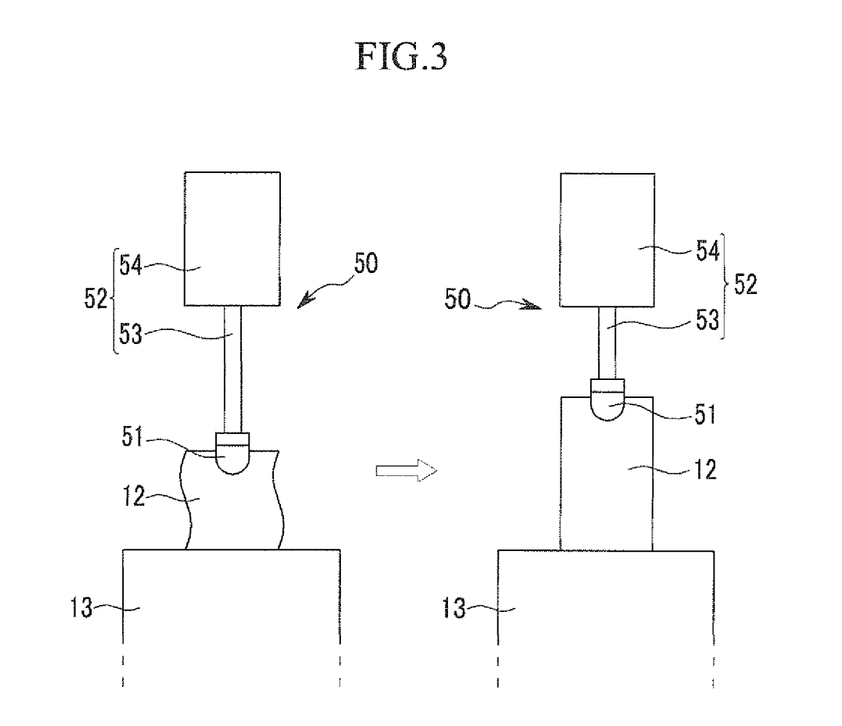
FIG. 3 is a schematic diagram showing an erect device in the laser cleaning device shown in FIG. 1.

FIG. 3 is a schematic diagram showing an erect device in the laser cleaning device shown in FIG. 1.

Referring to FIG. 3, the erect device 50 includes a holder unit 51 which fixes the electrode tab 12 by pressing the electrode tab 12 and a holder unit 51, and a vertical moving unit 52 which moves the holder unit 51 in a vertical direction. The holder unit 51 may be configured of tongs. The vertical moving unit 52 may include a linear motion device connected to the holder unit 51, and a cam 54 which drives the linear motion device 53. The vertical moving unit 52 may be formed of a combination of other mechanical devices other than the exemplary embodiment shown in FIG. 3.

When the holder unit 51 fits in the electrode tab 12 and the cam 54 is then driven, the electrode tab 12 fixed to the holder unit 51 is flatly spread while being erected by a backward action. Therefore, the surface area of the electrode tab 12 onto which the laser beam (LB) is irradiated is expanded, thereby making it possible to improve the cleaning efficiency by the laser beam (LB). The electrode tab 12 may maintain an angle of 80° to 100° with respect to the irradiation direction of the laser beam (LB).

Referring back to FIG. 1, a plurality of battery cases 13 are included in the cleaning housing 10, and the plurality of battery cases 13 may move along the defined orbit and reach the cleaning position one by one. The cleaning position is defined as a position which receives the laser beam (LB), facing the laser emitting unit 40.

Figure 4:
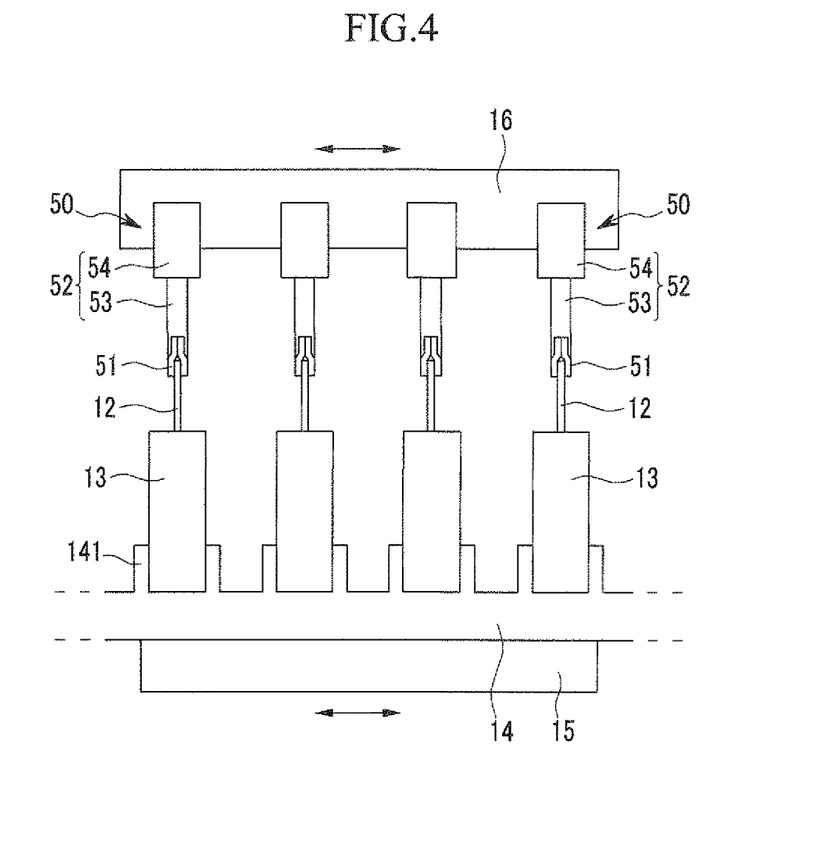
FIG. 4 is a schematic diagram showing a battery case and a support in the laser cleaning device shown in FIG. 1.

FIG. 4 is a schematic diagram showing a battery case and a support in the laser cleaning device shown in FIG. 1.

Referring to FIG. 4, the support 14 includes a plurality of supporting holders 141 to support the plurality of battery cases 13 at a predetermined distance. The lower portion of the support 14 is provided with the first transferring unit 15 to move the support 14 and the battery case 13 along the defined orbit. The first transferring unit 15 may move the support 14 in a straight direction or it may move the support 14 along an orbit in the shape of a closed curved line, such as a circle, an oval, etc.

In this case, the plurality of erect devices 50 are provided in correspondence to the number of battery cases 13, and the second transferring unit 16 is provided on the upper portions of the erect devices 50 so as to move the plurality of erect devices 50 along the same orbit as the first transferring unit 15. The first transferring unit 15 and the second transferring unit 16 are configured as a combination of a rack gear, a pinion gear and a motor, or may be configured as a combination of other mechanical devices.

The electrode tab 12 of the battery case 13 which is disposed at the cleaning position receives the laser beam (LB) so as to perform the cleaning operation. Then, the first transferring unit 15 and the second transferring unit 16 are operated, and they dispose and stop the electrode tab 12 of the battery case 13. Then, the electrode tab 12 of the battery case 13 disposed at the cleaning position receives the laser beam (LB), thereby performing the cleaning operation. In this case, while the first transferring unit 15 and the second transferring unit 16 are operated, the laser source 21 is turned off so that the laser beam (LB) is not emitted. By a repeated process, the plurality of electrode tabs 12 can be continuously cleaned.

Referring back to FIG. 1, the laser cleaning device 100 includes a laser absorber 17 which is disposed at the rear of the electrode tab 12 in the cleaning housing 10. The laser absorber 17 is disposed so as to face the laser emitting unit 40, putting the electrode tab 12 therebetween, and is formed so as to have a larger area than the electrode tab 12.

A diameter of the laser beam (LB) reaching the electrode tab 12 is set to be larger than a width of the electrode tab 12 in order to smoothly clean the electrode tab 12. Thereby, a portion of the laser beam (LB) reaches the electrode tab 12 so as to vaporize the electrode solution stuck to the electrode tab 12, but the remaining portion is diffused to the inside of the cleaning housing 10. In this case, the laser absorber 17 receives the laser beam (LB) which does not reach the electrode tab 12, thereby absorbing the remaining energy of the laser beam (LB).

If it is assumed that there is no laser absorber 17, the laser beam which does not reach the electrode tab 12, among the laser beam (LB) emitted from the laser emitting unit 40, reaches other members in the cleaning housing 10, and damages them or diffuses in several directions in the cleaning housing 10 so as to cause the fault of other members. However, the laser cleaning device 100 according to the present exemplary embodiment includes the laser absorber 17 so as to solve the above-mentioned problem.

The laser cleaning device 100 include an exhaust unit 60 that safely removes the pollutants generated during the cleaning process. The exhaust unit 60 includes a blower 61 which sucks air including pollutants, a dust collecting device 62 which collects and removes the pollutants, and an exhaust duct 63 which discharges air from which pollutants are removed to the outside of the cleaning housing 10. The exhaust unit 60 may be disposed just on the battery case 13 and the erect device 50 in order to rapidly remove the pollutants. The pollutants can be safely removed by using the above-mentioned exhaust unit 60.

Furthermore, the laser cleaning device 100 includes a monitoring system which monitors and records the cleaning process of the electrode tab 12. The monitoring system includes a photographing unit 71 which photographs the cleaning process of the electrode tab 12 and a display unit 72 which displays the image information obtained by the photographing unit 71. The photographing unit 71 may be fixed to the inside of the cleaning housing 10 (for example, the casing 41 of the laser emitting unit 40), and the display unit 72 is disposed outside the cleaning housing 10.

Figure 5:
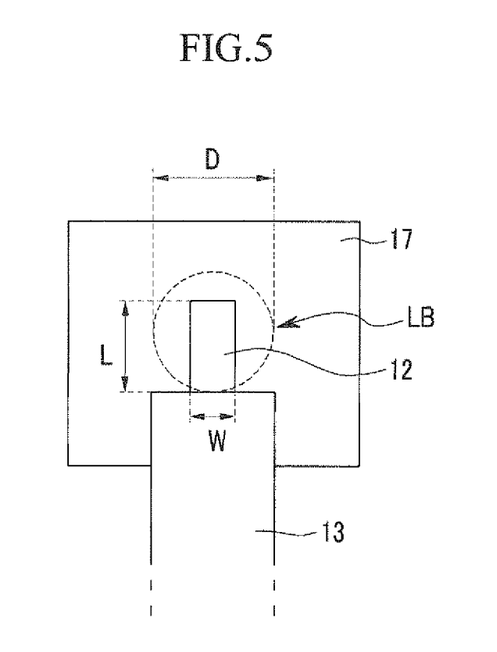
FIG. 5 is a schematic diagram showing an electrode tab and a laser absorber in the laser cleaning device shown in FIG. 1, wherein an erect device is omitted for convenience.

FIG. 5 is a schematic diagram showing an electrode tab and a laser absorber in the laser cleaning device shown in FIG. 1. An erecting device is omitted for convenience in FIG. 5.

Referring to FIG. 5, the electrode tab 12 has predetermined width W and length L, and is formed so as to have a thickness of approximately 1 mm. For example, the width W of the electrode tab 12 may be approximately 3 mm and the length L of the electrode tab 12 exposed to the outside of the battery case 13 may be approximately 6 mm.

The laser beam (LB) may be a circle, and the diameter D of the laser beam (LB) reaching the electrode tab 12 may be two to three times as large as the width W of the electrode tab 12. The laser beam (LB) is irradiated onto one surface of the electrode tab 12 facing the laser emitting unit 40, but the electrolyte solution stuck to an opposite surface of the electrode tab 12 is vaporized and removed together by the thermal transfer of the electrode tab 12.

If it is determined that the diameter of the laser beam (LB) is two times smaller than the width W of the electrode tab 12, at least one of the position of the laser beam (LB) and the position of the electrode tab 12 should be very precisely controlled, such that additional processes are required. Meanwhile, if it is determined that the diameter of the laser beam (LB) exceeds three times the width W of the electrode tab 12, the energy density per unit area of the laser beam (LB) is low, such that the cleaning effect is deteriorated.

Figure 6:
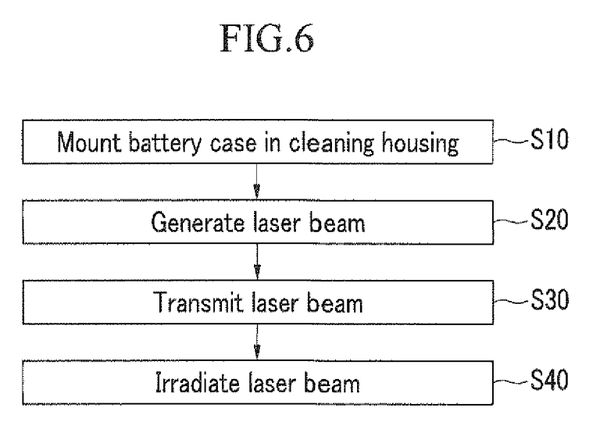
FIG. 6 is a flowchart showing a laser cleaning method for an electrode tab of a battery according to an exemplary embodiment.

FIG. 6 is a flowchart showing a laser cleaning method for an electrode tab of a battery according to an exemplary embodiment.

Referring to FIG. 6, a laser cleaning method for an electrode tab of a battery according to the exemplary embodiment includes: a first step (S10) of mounting the battery case, from which the electrode tab is exposed, in the cleaning housing; a second step (S20) of generating the laser beam for controlling the output by using the generator; a third step (S30) of transmitting the laser beam to the laser emitting unit in the cleaning housing by the laser transmitter; and a fourth step (S40) of controlling the optical magnification of the laser emitting unit so as to emit the optimized laser beam to the electrode tab.

Figure 7:
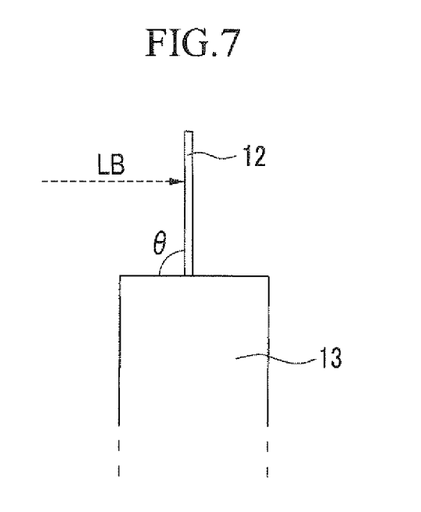
FIG. 7 is a schematic diagram showing an electrode tab at a first step shown in FIG. 6.

In the first step S10, the electrode tab 12 may be straightly erected and spread by using the erect device 50 installed in the cleaning housing 10. FIG. 7 is a diagram schematically showing the electrode tab at the first step shown in FIG. 6, wherein the electrode tab 12 may be maintained at an angle θ of 80° to 100° with respect to the irradiation direction of the laser beam (LB). If it is determined that the angle θ of the electrode tab 12 is smaller than 80° or exceeds 100°, the energy density per the unit area of the laser beam (LB) is low, such that the cleaning efficiency is deteriorated.

In addition, the plurality of battery cases 13 are installed in the cleaning housing 10 and the plurality of battery cases may be sequentially positioned one by one by using the first transferring unit 15 and the second transferring unit 16.

In the second step S20, the laser beam may be the Nd:YAG pulse laser and the energy per pulse of the laser beam (LB) may be 14 J to 34 J.

In the fourth step, the laser emitting unit 40 uses at least one of the above-mentioned magnifying optical unit 42, the modifying optical unit 43, and the focusing optical unit 44 to control the shape and size of the laser beam (LB) and the energy density per unit area, and emit the controlled laser beam (LB) to the electrode tab 12.

In this case, the size of the laser beam (LB) is larger than the area of the electrode tab 12 exposed to the outside of the battery case 13, and the diameter of the laser beam (LB) is set so as to be two to three times larger than the width of the electrode tab 12. The electrode tab 12 receiving the laser beam (LB) is cleaned, while the electrolyte solution stuck to the surface is vaporized by the thermal energy of the laser beam (LB). In addition, the laser absorber 17 is positioned at the rear of the electrode tab 12, thereby absorbing the remaining energy of the laser beam (LB).

The pollutants, such as fume, generated during the laser cleaning process are collected in the dust collecting device 62 installed in the cleaning housing 10, and are safely removed. The above-mentioned laser cleaning technology does not apply the friction to the electrode tab 12, such that it is efficient in cleaning the electrode tab 12 having a small thickness, and the damage or secondary pollution of the electrode tab 12 does not occur.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A laser cleaning device for an electrode tab of a battery, comprising:
    a cleaning housing, in which a battery case for receiving an electrode group, an electrolyte solution and the electrode tab which is exposed to an exterior of the battery case, are embedded;
    a laser generator which includes a laser source for generating a laser beam and an output controller for controlling output of the laser beam;
    a laser transmitter which transmits the laser beam generated by the laser generator; and
    a laser emitting unit which is installed inside the cleaning housing and disposed to remove liquid pollutants stuck to the electrode tab by irradiating the laser beam transmitted by the laser transmitter onto the electrode tab.

2. The laser cleaning device of claim 1, wherein the laser source generates Nd:YAG pulse laser, and energy per pulse of the Nd:YAG pulse laser is in a range of 14 J to 34 J.

3. The laser cleaning device of claim 1, wherein the laser transmitter is configured as an optical fiber cable.

4. The laser cleaning device of claim 1, wherein the laser emitting unit includes at least one of a magnifying optical unit, a modifying optical unit, and a focusing optical unit.

5. The laser cleaning device of claim 4, wherein the modifying optical unit includes a laser absorption mask in which an opening determining a shape of the laser beam is formed.

6. The laser cleaning device of claim 4, wherein the focusing optical unit includes a convex lens and a lens moving unit which changes a position of the convex lens.

7. The laser cleaning device of claim 1, wherein the laser emitting unit emits a laser beam having a diameter in a range of two to three times larger than a width of the electrode tab.

8. The laser cleaning device of claim 1, further comprising a positional controller which is coupled to the laser emitting unit for changing a position of the laser emitting unit.

9. The laser cleaning device of claim 1, further comprising an erect device which is installed inside the cleaning housing, and which is connected to the electrode tab so as to erect and spread the electrode tab.

10. The laser cleaning device of claim 9, wherein the erect device includes a holder unit which pressurizes the electrode tab so as to fix the electrode tab, and a vertical moving unit which moves the holder unit in a vertical direction.

11. The laser cleaning device of claim 9, wherein a plurality of battery cases are provided at a distance from each other, and the laser cleaning device further includes a support which supports the plurality of battery cases and a first transferring unit which is installed on the support and which moves the plurality of battery cases along a defined orbit.

12. The laser cleaning device of claim 11, wherein a plurality of erect device are provided in correspondence to a number of the battery cases, and the laser cleaning device further includes a second transferring unit which is connected to the plurality of erect devices so as to move the plurality of erect devices along a same orbit as the first transferring unit.

13. The laser cleaning device of claim 1, further comprising a monitoring system which monitors and records a cleaning process of the battery tab, wherein the monitoring system includes a photographing unit which photographs the cleaning process of the battery tab and a display unit which displays image information obtained from the photographing unit.

14. The laser cleaning device of claim 1 performing a laser cleaning method, wherein, during the embedding of the battery case in the cleaning housing, an erect device is used to erect and spread the electrode tab.

15. The laser cleaning device of claim 14 performing a laser cleaning method, wherein the electrode tab is erected so as to be maintained at an angle in a range of 80° to 100° with respect to an irradiation direction of the laser beam.

16. The laser cleaning device of claim 1 performing a laser cleaning method, wherein, during the irradiating of the laser beam, a diameter of the laser beam is in a range of two to three times a width of the electrode tab.

17. The laser cleaning device of claim 1 performing a laser cleaning method, wherein, during the irradiating of the laser beam, a laser absorber is absorbed in a rear of the electrode tab so as to absorb remaining energy of the laser beam.

18. The laser cleaning device of claim 1 performing a laser cleaning method, wherein, during the irradiating of the laser beam, pollutants are collected and removed during a laser cleaning process by using a dust collecting device.

19. A laser cleaning method for an electrode tab of a battery, comprising the steps of:
 mounting a battery case, which receives an electrolyte solution and exposes an electrode tab, in a cleaning housing;
 generating a laser beam controlled by a laser generator;
 transmitting the laser beam to a laser emitting unit by using a laser transmitter; and
 setting a shape and a size of the laser beam by controlling optical magnification of the laser emitting unit, and then irradiating the laser beam onto the electrode tab.

20. The laser cleaning method of claim 19, wherein, during the step of mounting the battery case, the electrode tab is erected and spread by using an erect device.

21. The laser cleaning method of claim 20, wherein the electrode tab is erected so as to be maintained at an angle in a range of 80° to 100° with respect to an irradiation direction of the laser beam.

* * * * *